(12) United States Patent
Kameyama

(10) Patent No.: US 11,740,572 B2
(45) Date of Patent: Aug. 29, 2023

(54) ELECTROPHOTOGRAPHIC BELT AND ELECTROPHOTOGRAPHIC IMAGE FORMING APPARATUS

(71) Applicant: CANON KABUSHIKI KAISHA, Tokyo (JP)

(72) Inventor: Naoto Kameyama, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 22 days.

(21) Appl. No.: 17/659,244

(22) Filed: Apr. 14, 2022

(65) Prior Publication Data

US 2022/0365464 A1 Nov. 17, 2022

(30) Foreign Application Priority Data

Apr. 22, 2021 (JP) ................................. 2021-072919
Mar. 16, 2022 (JP) ................................. 2022-041929

(51) Int. Cl.
*G03G 15/16* (2006.01)
*G03G 5/10* (2006.01)
*G03G 5/147* (2006.01)

(52) U.S. Cl.
CPC ............. *G03G 15/162* (2013.01); *G03G 5/10* (2013.01); *G03G 5/14726* (2013.01)

(58) Field of Classification Search
CPC .................................................. G03G 15/162
See application file for complete search history.

(56) References Cited

U.S. PATENT DOCUMENTS

| 8,962,133 B2 | 2/2015 | Sato et al. |
| 9,250,546 B2 | 2/2016 | Kameyama |

(Continued)

FOREIGN PATENT DOCUMENTS

| JP | 2010-204136 A | 9/2010 |
| JP | 2010-224376 A | 10/2010 |

(Continued)

OTHER PUBLICATIONS

Park, et al., Synthesis of fluorine-containing graft copolymers of poly (perfluoroalkylethyl methacrylate)-g-poly(methyl methacrylate) by the macromonomer technique and emulsion copolymerization method, Polymer, vol. 38, No. 10 (1997) 2523-27.

*Primary Examiner* — Ian A Rummel
(74) *Attorney, Agent, or Firm* — Venable LLP

(57) ABSTRACT

Provided is an electrophotographic belt including at least: a base layer; and a surface layer containing the following A, B, and C:
A: a compound 1 having structures represented by formula (I) and formula (II):

(Continued)

in the formula (I), R1 represents a linking group, and R2 represents a hydrogen atom or a methyl group;

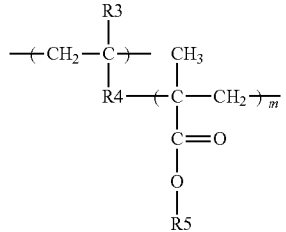

(II)

in the formula (II), R3 represents a hydrogen atom, a methyl group, or a methyl ester group, R4 represents a linking group, R5 represents a methyl group or a tert-butyl group, and "m" represents an integer of from 25 to 100;

B: perfluoropolyether;

C: a binder resin.

8 Claims, 2 Drawing Sheets

(56) References Cited

U.S. PATENT DOCUMENTS

| | | |
|---|---|---|
| 9,720,353 B2 | 8/2017 | Sakamoto |
| 10,025,232 B2 | 7/2018 | Sakamoto |
| 10,585,365 B2 | 3/2020 | Sakimura |
| 2008/0199795 A1 | 8/2008 | Ogaki |
| 2010/0221652 A1 | 9/2010 | Nukada |
| 2010/0248105 A1 | 9/2010 | Nukada |
| 2019/0004454 A1 | 1/2019 | Karube |
| 2020/0019093 A1 | 1/2020 | Tsuruga et al. |
| 2020/0310302 A1 | 10/2020 | Suzuki |
| 2021/0103236 A1 | 4/2021 | Takenaga |
| 2021/0341859 A1 | 11/2021 | Kameyama |

FOREIGN PATENT DOCUMENTS

| | | |
|---|---|---|
| JP | 2010-230970 A | 10/2010 |
| JP | 2011-22411 A | 2/2011 |
| JP | 2011-118054 A | 6/2011 |
| JP | 2011-203675 A | 10/2011 |
| JP | 2019-12265 A | 1/2019 |
| JP | 2019-184728 A | 10/2019 |
| JP | 2020-160160 A | 10/2020 |
| JP | 2021-60577 A | 4/2021 |
| WO | 2008/053904 A1 | 5/2008 |

ELECTROPHOTOGRAPHIC BELT AND ELECTROPHOTOGRAPHIC IMAGE FORMING APPARATUS

BACKGROUND

Technical Field

The present disclosure relates to an electrophotographic belt to be used in an electrophotographic image forming apparatus, such as a copying machine or a printer, and an electrophotographic image forming apparatus including an electrophotographic belt.

Description of the Related Art

In an electrophotographic image forming apparatus capable of forming a full-color image, there has been widely adopted a tandem system in which toner images of respective colors of yellow, magenta, cyan, and black (YMCK) are superimposed on an intermediate transfer belt and then collectively transferred onto paper to provide a full-color image. As the intermediate transfer belt to be used in this case, there is known, for example, an electrophotographic belt including a base layer having carbon black dispersed in a binder resin, such as polyimide or polyether ether ketone.

Along with a requirement for a further increase in image quality of an electrophotographic image, there is a demand that the intermediate transfer belt be further improved in secondary transfer characteristic for toner. In order to improve the secondary transfer property of the intermediate transfer belt, there is a proposal that perfluoropolyether be incorporated into a surface layer serving as a toner-carrying surface (hereinafter sometimes referred to simply as "surface") of the intermediate transfer belt to enhance toner releasability of the surface.

In addition, in Japanese Patent Application Laid-Open No. 2019-12265, there is a disclosure of an electrophotographic belt including a surface layer having perfluoropolyether dispersed in a binder resin by a comb-shaped graft copolymer. The comb-shaped graft copolymer has a specific molecular weight, and is a copolymerization product of a (meth)acrylate having a fluoroalkyl group and a methacrylate macromonomer having polymethyl methacrylate in a side chain thereof. There is a disclosure that use of such comb-shaped graft copolymer allows the perfluoropolyether to be better dispersed in the binder resin.

An investigation made by the inventors found that the comb-shaped graft copolymer according to Japanese Patent Application Laid-Open No. 2019-12265 was excellent in dispersibility of the perfluoropolyether. In this connection, the inventors made an investigation into setting the number of consecutive carbon atoms having fluorine atoms bonded thereto in the comb-shaped graft copolymer to 3 or less. Specifically, an investigation was made into introducing an oxygen atom into a carbon chain serving as a main chain of a perfluoroalkyl group and setting the number of consecutive carbon atoms having fluorine atoms bonded thereto to 3 or less. It is considered that an organofluorine compound in which the number of consecutive carbon atoms having fluorine atoms bonded thereto is set to 3 or less is excellent in degradability in the natural environment, and hence hardly persists in the environment. In view of this, the inventors made an investigation into an electrophotographic belt including a surface layer having perfluoropolyether dispersed in a binder resin through use of the above-mentioned comb-shaped graft copolymer that was considered to be environmentally friendly. As a result, a cleaning property of the surface of the electrophotographic belt was reduced over time in some cases.

SUMMARY

At least one aspect of the present disclosure is directed to providing an electrophotographic belt excellent in environmental friendliness, and capable of satisfactorily maintaining the cleaning property of its surface over a long period of time. In addition, another aspect of the present disclosure is directed to providing an electrophotographic image forming apparatus capable of stably forming a high-quality electrophotographic image.

According to one aspect of the present disclosure, there is provided an electrophotographic belt including at least a base layer and a surface layer. The surface layer contains the following A, B, and C:

A: a compound 1 having a structure represented by a structural formula (I) and a structure represented by a structural formula (II):

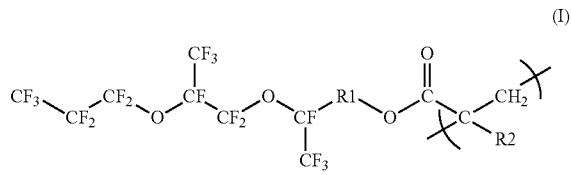

in the formula (I),
R1 represents a linking group, and
R2 represents a hydrogen atom or a methyl group;

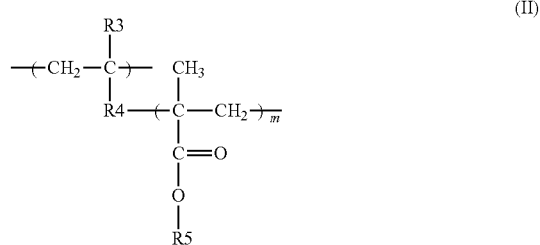

in the formula (II),
R3 represents a hydrogen atom, a methyl group, or a methyl ester group,
R4 represents a linking group,
R5 represents a methyl group or a tert-butyl group, and
"m" represents an integer of from 25 to 100;
B: perfluoropolyether;
C: a binder resin.

In addition, according to another aspect of the present disclosure, there is provided an electrophotographic image forming apparatus including: an image bearing member configured to bear a toner image; and an intermediate transfer belt configured to carry and convey the toner image that is primarily transferred from the image bearing member in order to secondarily transfer the toner image onto a transfer material, wherein the intermediate transfer belt is the above-mentioned electrophotographic belt.

Further features of the present disclosure will become apparent from the following description of exemplary embodiments with reference to the attached drawings.

DESCRIPTION OF THE EMBODIMENTS

The reason why the satisfactory cleaning property of the surface of an electrophotographic belt including a surface layer having perfluoropolyether dispersed in a binder resin through use of the above-mentioned comb-shaped graft copolymer that is considered to be environmentally friendly is reduced over time is conceived to be as described below. That is, the comb-shaped graft copolymer in which the number of consecutive carbon atoms having fluorine atoms bonded thereto is set to 3 or less is conceivably reduced in ability to disperse the perfluoropolyether. Accordingly, it is difficult to finely disperse the perfluoropolyether in the binder resin. As a result, large domains of perfluoropolyether are caused to be present in the surface layer. The hardness of such surface layer is low, and hence its surface is worn down through repeated cleaning with a cleaning blade. It is conceived that, along with this, the perfluoropolyether is also lost from the surface layer, leading to a reduction in toner releasability of the surface.

Based on such discussion, further investigations have been made, and as a result, it has been found that a compound having the structure represented by the above-mentioned chemical structural formula (I) and the structure represented by the above-mentioned chemical structural formula (II) has an environmentally friendly structure, and is excellent in ability to disperse perfluoropolyether in a binder resin.

Exemplary embodiments of the present disclosure are described in the following in detail with reference to the attached drawings. However, specific aspects, for example, the dimensions, materials, shapes, relative positional relationship, and the like of structural elements described in the following embodiments may be appropriately changed depending on the structure of the apparatus to which the present disclosure is applied and various conditions, and the scope of the present disclosure is not limited only to the specific aspects.

[Image Forming Apparatus]

Figure 1:
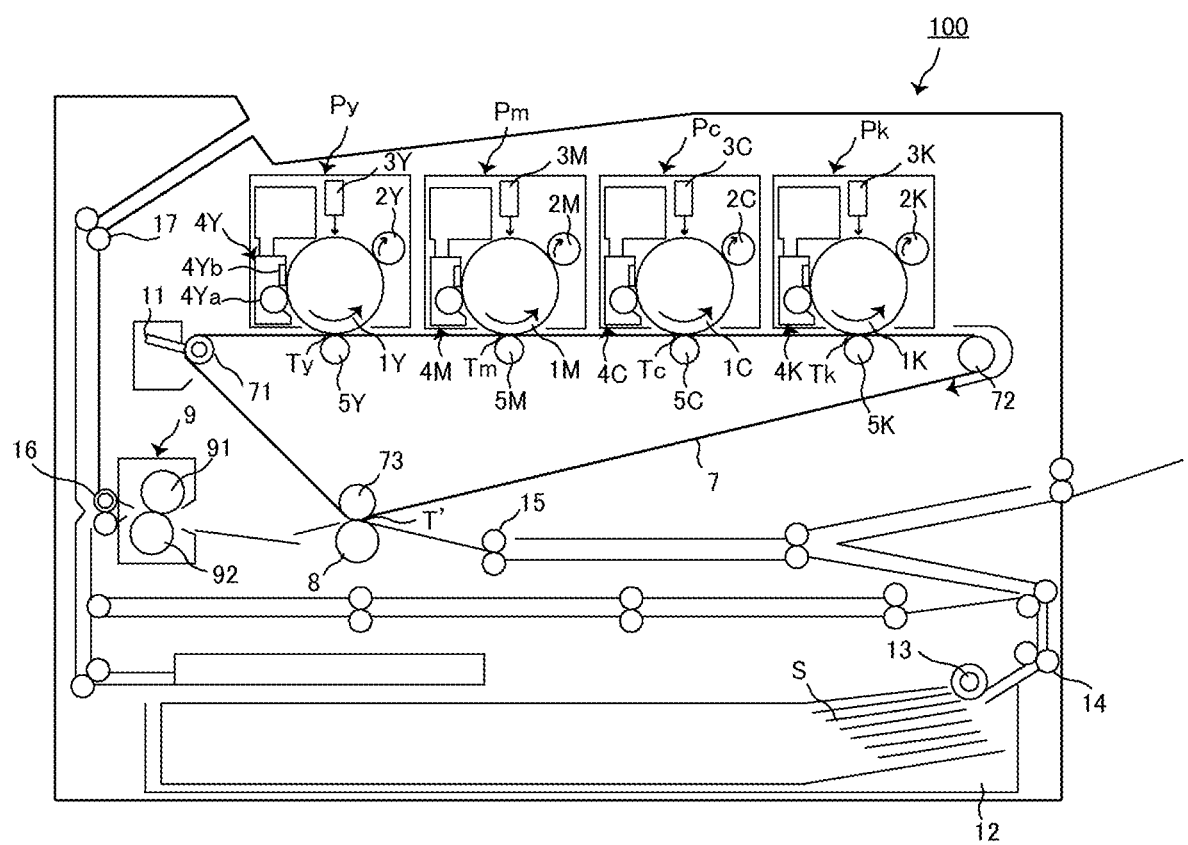
FIG. 1 is a schematic sectional view of an image forming apparatus according to an embodiment of the present disclosure.

FIG. 1 is a schematic sectional view of an electrophotographic image forming apparatus 100, which is an electrophotographic image forming apparatus including an electrophotographic belt according to one embodiment of the present disclosure.

In the electrophotographic image forming apparatus, image forming units Py, Pm, Pc, and Pk of respective colors of yellow (Y), magenta (M), cyan (C), and black (K) are arranged in the stated order along a flat portion of an intermediate transfer belt 7 that is an intermediate transfer member in a movement direction thereof. Herein, there are illustrated electrophotographic photosensitive members 1Y, 1M, 1C, and 1K, and charging rollers 2Y, 2M, 2C, and 2K. There are also illustrated laser exposure devices 3Y, 3M, 3C, and 3K, developing devices 4Y, 4M, 4C, and 4K, and primary transfer rollers 5Y, 5M, 5C, and 5K. The basic configurations of the respective image forming units are the same, and hence the details thereof are described only with respect to the yellow image forming unit Py.

The yellow image forming unit Py includes, as an image bearing member, the drum-type electrophotographic photosensitive member (hereinafter sometimes referred to as "photosensitive drum" or "first image bearing member") 1Y. The photosensitive drum 1Y is formed by laminating a charge generating layer, a charge transporting layer, and a surface protective layer in the stated order on a cylinder made of aluminum serving as a substrate.

In addition, the yellow image forming unit Py includes the charging roller 2Y serving as a charging unit. The surface of the photosensitive drum 1Y is uniformly charged by applying a charging bias to the charging roller 2Y.

The laser exposure device 3Y serving as an image exposure unit is arranged above the photosensitive drum 1Y. The laser exposure device 3Y scans and exposes the surface of the uniformly charged photosensitive drum 1Y in accordance with image information, to thereby form an electrostatic latent image of a yellow color component on the surface of the photosensitive drum 1Y.

The electrostatic latent image formed on the photosensitive drum 1Y is developed with a toner serving as a developer by the developing device 4Y serving as a developing unit. The developing device 4Y includes a developing roller 4Ya serving as a developer carrier and a regulating blade 4Yb serving as a developer amount regulating member, and accommodates a yellow toner serving as a developer. The developing roller 4Ya having the yellow toner supplied thereto is brought into light pressure contact with the photosensitive drum 1Y in a developing portion, and is rotated in a forward direction with a speed difference from the photosensitive drum 1Y. The yellow toner conveyed to the developing portion by the developing roller 4Ya adheres to the electrostatic latent image formed on the photosensitive drum 1Y when a developing bias is applied to the developing roller 4Ya.

As a result, a visible image (yellow toner image) is formed on the photosensitive drum 1Y.

The intermediate transfer belt 7 is tensioned on a drive roller 71, a tension roller 72, and a driven roller 73, and is brought into contact with the photosensitive drum 1Y to be moved (driven to rotate) in a direction of the arrow in the figure.

The yellow toner image formed on the photosensitive drum (first image bearing member) 1Y having reached a primary transfer portion Ty is primarily transferred onto the intermediate transfer belt 7 by a primary transfer member (primary transfer roller 5Y) arranged so as to be opposed to the photosensitive drum 1Y through intermediation of the intermediate transfer belt 7.

Similarly, the above-mentioned image forming operation is performed in the image forming units Pm, Pc, and Pk of respective colors of magenta (M), cyan (C), and black (K) along with the movement of the intermediate transfer belt 7, and toner images of four colors of yellow, magenta, cyan, and black are laminated on the intermediate transfer belt 7. The laminated four-color toner images are conveyed along with the movement of the intermediate transfer belt 7, and are collectively transferred onto a transfer material S (hereinafter sometimes referred to as "second image bearing member") conveyed at a predetermined timing by a secondary transfer roller 8 serving as a secondary transfer unit in a secondary transfer portion T'. In such secondary transfer, a transfer voltage of several kilovolts is generally applied in order to secure a sufficient transfer rate.

The transfer material S is supplied to a conveyance path by a pickup roller 13 from a cassette 12 in which the transfer material S is stored. The transfer material S supplied to the conveyance path is conveyed to the secondary transfer portion T' by a conveyance roller pair 14 and a registration roller pair 15 in synchronization with the four-color toner images transferred onto the intermediate transfer belt 7.

The toner images transferred onto the transfer material S are fixed by a fixing device 9 to form, for example, a full-color image. The fixing device 9 includes a fixing roller 91 including a heating unit and a pressure roller 92, and fixes the unfixed toner images on the transfer material S by heating and pressurization. After that, the transfer material S is delivered to the outside of the apparatus by a conveyance roller pair 16, a delivery roller pair 17, and the like.

A cleaning unit 11 of the intermediate transfer belt 7 is arranged on a downstream side with respect to the secondary transfer portion T' in a drive direction of the intermediate transfer belt 7, and removes a transfer residual toner remaining on the intermediate transfer belt 7 without being transferred onto the transfer material S in the secondary transfer portion T'.

As described above, the electrical transfer process of the toner images from the photosensitive member to the intermediate transfer belt and from the intermediate transfer belt to the transfer material is repeated. In addition, when recording on a large number of transfer materials is repeated, the electrical transfer process is further repeated.

[Electrophotographic Belt]

Figure 2:
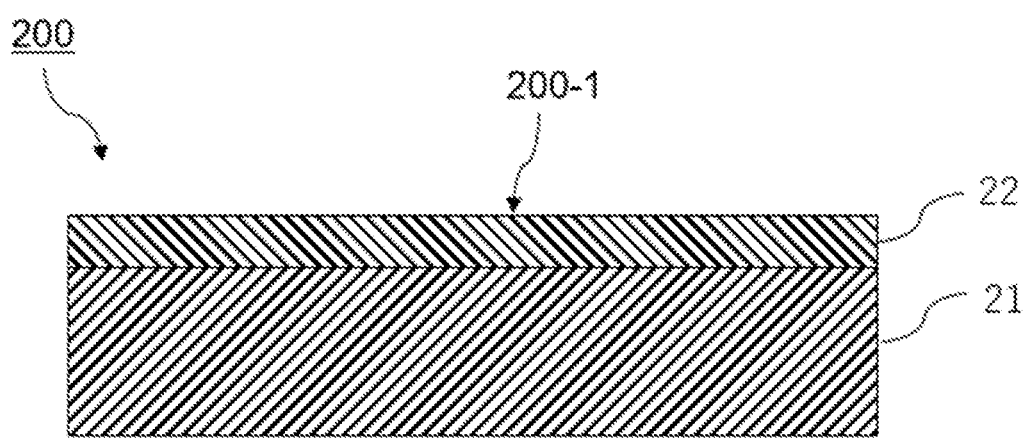
FIG. 2 is a sectional view for illustrating the configuration of an intermediate transfer belt according to an embodiment of the present disclosure.

As illustrated in FIG. 2, an electrophotographic belt 200 according to this embodiment is a laminate including at least two layers: a base layer 21 and a surface layer 22. The surface layer 22 constitutes the toner-carrying surface of the electrophotographic belt 200, that is, a surface 200-1.

The configuration of the electrophotographic belt according to the present disclosure is not limited to the laminate of the above-mentioned two layers. For example, there may be adopted a configuration in which a primer layer (not shown) for improving adhesiveness, or a stress relaxation layer for suppressing the cracking of the surface layer 22 or an intermediate layer for suppressing a bled substance (none of which is shown) is arranged between the base layer 21 and the surface layer 22.

(Base Layer)

The shape of the base layer 21 is a cylindrical shape that is an endless roll or belt shape.

Examples of a material suitable for the base layer 21 include the following materials: polyether ether ketone; polyethylene terephthalate; polybutylene naphthalate; polyester; polyimide; polyamide; polyamideimide; polyacetal; polyphenylene sulfide; and polyvinylidene fluoride.

A resin for the base layer 21 may have electroconductivity imparted thereto by adding metal powder, electroconductive oxide powder, electroconductive carbon, a lithium salt, an ionic liquid, or any other electroconductive compound. In Examples to be described later, polyimide having added thereto carbon black was used from the viewpoint of enabling the achievement of excellent electroconductivity and environmental stability. However, a combination of any other resin and electroconductivity-imparting agent among the listed examples may be used.

The thickness of the base layer 21 is preferably 10 µm or more and 500 µm or less. This is because of the following reasons: when the thickness is less than 10 µm, mechanical strength may be markedly reduced; and when the thickness is more than 500 µm, rigidity may become excessively strong, and hence it may be difficult to use the intermediate transfer belt as an intermediate transfer member.

(Surface Layer)

The surface layer 22 is formed on the base layer 21, serves as the outermost layer of the intermediate transfer belt according to this embodiment, and contains all of the following A, B, and C:

A: a compound 1 (hereinafter sometimes referred to as "graft copolymer") having the structure represented by the above-mentioned chemical structural formula (I) and the structure represented by the above-mentioned chemical structural formula (II);

B: perfluoropolyether (hereinafter sometimes referred to as "PFPE"); and

C: a binder resin.

The surface layer 22 may contain a photopolymerization initiator, an electroconductive substance, or the like in addition to the above-mentioned binder resin, PFPE, and graft copolymer.

<C: Binder Resin>

One or more resins selected from the group consisting of: an acrylic resin; a methacrylic resin; and an epoxy resin may be used as the binder resin. The term "one or more resins" encompasses a mixed resin of resins selected from the above-mentioned group.

The binder resin functions as a dispersion medium for the PFPE. In addition, the binder resin is a material for securing the adhesiveness of the surface layer to the base layer 21, and securing the mechanical strength of the surface layer itself.

Of the above-mentioned binder resins, a methacrylic resin or an acrylic resin is preferably used because the PFPE for forming the surface layer 22 of the electrophotographic belt can be satisfactorily dispersed. The methacrylic resin and the acrylic resin are hereinafter collectively referred to as "acrylic-based resin".

Examples of a polymerizable monomer for forming the acrylic-based resin include the following (i) and (ii). A product commercially available as a coating material may also be used as the polymerizable monomer.

(i) At least one kind of acrylate selected from the group consisting of the following acrylates: pentaerythritol triacrylate; pentaerythritol tetraacrylate; ditrimethylolpropane tetraacrylate; dipentaerythritol hexaacrylate; an alkyl acrylate; benzyl acrylate; phenyl acrylate; ethylene glycol diacrylate; and bisphenol A diacrylate.

(ii) At least one kind of methacrylate selected from the group consisting of the following methacrylates: pentaerythritol trimethacrylate; pentaerythritol tetramethacrylate; ditrimethylolpropane tetramethacrylate; dipentaerythritol hexamethacrylate; an alkyl methacrylate; benzyl methacrylate; phenyl methacrylate; ethylene glycol dimethacrylate; and bisphenol A dimethacrylate.

The binder resin preferably has a high hardness in consideration of rubbing with other members, such as a photosensitive member and a cleaning blade. For this reason, it is preferred that the acrylic-based resin be caused to have a higher hardness through use of a larger amount of a bi- or higher functional crosslinkable monomer.

In addition, as a method of forming the acrylic resin from such polymerizable monomer, there is given a method involving adding a photopolymerization initiator and causing polymerization with an electron beam or UV light.

Examples of the photopolymerization initiator include the following initiators: radical-generating photopolymerization initiators, such as benzophenone, a thioxanthone-based initiator, benzyl dimethyl ketal, an α-hydroxy ketone, an α-hydroxyalkylphenone, an α-amino ketone, an α-aminoalkylphenone, a monoacylphosphine oxide, a bisacylphosphine oxide, hydroxybenzophenone, aminobenzophenone, a titanocene-based initiator, an oxime ester, and an oxyphenyl acetic acid ester.

The content of the binder resin in the surface layer is preferably set to 20 mass % or more and 70 mass % or less with respect to the mass of the total solid content of the surface layer 22 in order to allow the surface layer to have excellent strength, and allow the outer surface of the surface layer to carry excellent toner releasability.

<B: Perfluoropolyether>

The perfluoropolyether (hereinafter also referred to as "PFPE") refers to an oligomer or a polymer including a perfluoroalkylene ether as a repeating unit.

Examples of the repeating unit of the perfluoroalkylene ether include repeating units of a perfluoromethylene ether, a perfluoroethylene ether, and a perfluoropropylene ether. A commercially available product may be used as the PFPE. Examples of the commercially available product include, but not limited to, a PFPE represented by the structural formula (1) (e.g., Demnum S-200 and Demnum S-65 (product names), manufactured by Daikin Industries, Ltd.), a PFPE represented by the structural formula (2) (e.g., Krytox GPL-107, Krytox GPL-106, and Krytox GPL-105 (product names), manufactured by Chemours Company), a PFPE represented by the structural formula (3) (e.g., Fomblin M60 and Fomblin Z25 (product names), manufactured by Solvay Specialty Polymers), and a PFPE represented by the structural formula (4) (e.g., Fomblin Y45 and Fomblin Y25 (product names), manufactured by Solvay Specialty Polymers).

Structural formula (1)

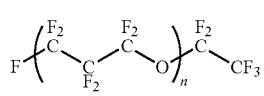

In the formula (1), "n" represents a positive number, and "n" represents a number within a range in which a kinematic viscosity at 40° C. satisfies the range of from 10 mm$^2$/s to 300 mm$^2$/s.

Structural formula (2)

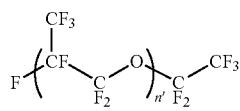

In the formula (2), n' represents a positive number, and n' represents a number within a range in which the kinematic viscosity at 40° C. satisfies the range of from 5 mm$^2$/s to 1,200 mm$^2$/s.

Structural formula (3)

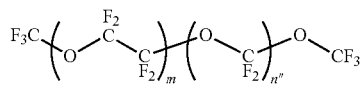

In the formula (3), n" and "m" each represent a positive number, m/n" is a number of 0.5 or more and 2 or less, and n"+m is such a number that the kinematic viscosity at 40° C. satisfies the range of from 10 mm$^2$/s to 900 mm$^2$/s.

Structural formula (4)

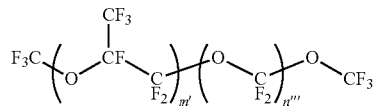

In the formula (4), n''' and m' each represent a positive number, m'/n''' is a number of 20 or more and 1,000 or less, and n'''+m' is a number within a range in which the kinematic viscosity at 40° C. satisfies the range of from 10 mm$^2$/s to 700 mm$^2$/s.

In addition, the PFPE may have a reactive functional group capable of forming a bond or a bond-like state with the binder resin, or a non-reactive functional group incapable of forming a bond or a bond-like state with the binder resin. Examples of the reactive functional group include an acrylic group, a methacrylic group, and an oxysilanyl group. In addition, examples of the non-reactive functional group include a hydroxyl group, a trifluoromethyl group, and a methyl group.

Examples of a commercially available product of the PFPE having the above-mentioned reactive functional group include the following products: "FLUOROLINK MD700", "FLUOROLINK AD1700", and "FLUOROLINK S10" (product names; manufactured by Solvay S.A.); and "Optool DAC" (product name; manufactured by Daikin Industries, Ltd.). The "MD-500" is a PFPE having a methacrylic group as a functional group, and the "FLUOROLINK AD1700" is a PFPE having an acrylic group as a functional group.

In addition, examples of a commercially available product of the PFPE having the above-mentioned non-reactive functional group include: "FLUOROLINK D10H", "FLUOROLINK D4000", and "Fomblin Z15" (product names, manufactured by Solvay S.A.); and "Demnum S-20", "Demnum S-65", and "Demnum 5200" (product names, manufactured by Daikin Industries, Ltd.).

<A: Compound 1>

The compound 1 according to the component A has the structure represented by the chemical structural formula (I) and the structure represented by the chemical structural formula (II). The compound 1 functions as a dispersant for dispersing the PFPE in the binder resin. The graft copolymer that is the compound 1 has both of a first unit represented by the following chemical structural formula (I) and a second unit represented by the following chemical structural formula (II).

The first unit is a moiety excellent in affinity for the PFPE, while the second unit is excellent in affinity for the binder resin. In addition, the first unit has a perfluoromethyl group as a side chain. This conceivably compensates for a reduction in ability to disperse the PFPE in the binder resin caused by introducing an oxygen atom and setting the number of consecutive carbon atoms in the perfluoroalkyl group to 3 or less. As a result, the compound 1 according to the present disclosure can allow the PFPE having low surface free energy to be better dispersed in the binder resin.

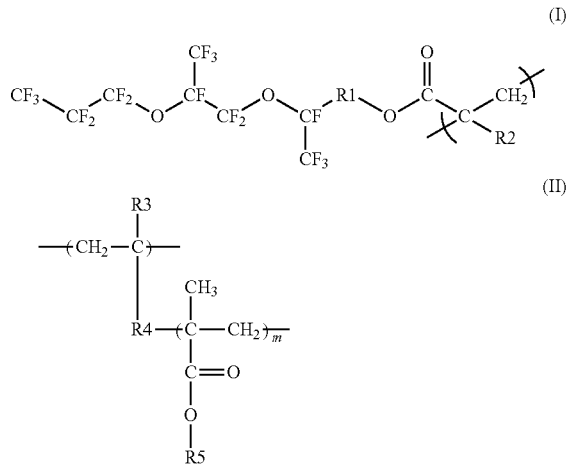

In the formula (II),

R3 represents a hydrogen atom, a methyl group, or a methyl ester group,

R4 represents a linking group,

R5 represents a methyl group or a tert-butyl group, and "m" represents an integer of from 25 to 100.

Examples of the linking group R1 in the chemical structural formula (I) include an alkylene group having 1 to 6 carbon atoms, and a group consisting of a carbon atom, a hydrogen atom, a nitrogen atom, and an oxygen atom, and having a main chain of which a number of atoms constituting the main chain is 6 or less. Specific examples thereof include an alkylene group having 1 to 6 carbon atoms (e.g., —$CH_2$— or —$CH_2CH_2$—), and a group represented by the following structural formula (i) in which a methylene group ($CH_2$) and an ethylene group ($CH_2CH_2$) are bonded via a urethane bond (—OC(=O)NH—). Here, in the structural formula (i), the main chain means —C—O—C—N—C—C—.

—$CH_2OC(=O)NHCH_2CH_2$—     (i)

Examples of the linking group R4 in the chemical structural formula (II) include a group consisting of a carbon atom, a hydrogen atom, an oxygen atom and a sulfur atom, and having a main chain of which a number of atoms constituting the main chain is 9 or less; and a group consisting of a carbon atom, a hydrogen atom, a nitrogen atom, an oxygen atom, and a sulfur atom, and having a main chain of which a number of atoms constituting the main chain is 9 or less. Specific examples of such group are represented by the following structural formulae (ii) to (iv). In the structural formula (ii), the main chain means —S—C—C—O—C—C—C—O—C—. In the structural formula (iii), the main chain means —S—C—C—C—N—C—C—O—C—. Further, in the structural formula (iv), the main chain means —S—C—C—N—C—C—O—C—.

—$SCH_2C(=O)OCH_2CH(OH)CH_2OC(=O)$—     (ii)

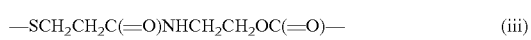

—$SCH_2CH_2C(=O)NHCH_2CH_2OC(=O)$—     (iii)

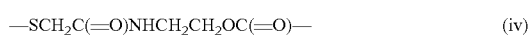

—$SCH_2C(=O)NHCH_2CH_2OC(=O)$—     (iv)

The peak top molecular weight of the compound 1 is preferably 20,000 or more and 40,000 or less.

When the peak top molecular weight falls within the above-mentioned numerical range, a high steric hindrance effect can be expressed to effectively suppress aggregation between PFPE molecules.

The compound 1 may also be defined as an acrylic resin or methacrylic resin having grafted thereonto a group having a perfluoroalkyl group having 3 carbon atoms. Such compound may be obtained by copolymerizing a macromonomer and a monofunctional monomer. Here, the macromonomer is a compound having a high molecular weight as compared to a general monomer, and having a reactive group. The graft copolymer may be obtained by polymerizing a macromonomer having one polymerizable functional group per molecule out of such macromonomers with a monomer having one polymerizable functional group per molecule.

According to one aspect of the present disclosure, the electrophotographic belt excellent in environmental friendliness and capable of forming a satisfactory electrophotographic image over a long period of time can be obtained. In addition, according to one aspect of the present disclosure, the electrophotographic image forming apparatus capable of stably forming a high-quality electrophotographic image can be obtained.

EXAMPLES

The electrophotographic belt according to the present disclosure is described in more detail below by way of non-limiting specific examples.

<Preparation of Macromonomers>

<<Macromonomer No. 1>>

A macromonomer having a methyl methacrylate segment (product name: AA-6; manufactured by Toagosei Co., Ltd., R3 and R5: —$CH_3$, number-average molecular weight: 6,000) was prepared as a macromonomer No. 1.

<<Macromonomer No. 2>>

Materials shown in Table 1 below were loaded into a glass flask with a reflux condenser tube, and nitrogen purging was performed while a temperature in the flask was kept at 15° C. in a water bath.

TABLE 1

| Compound name | Blending amount (part(s) by mass) |
|---|---|
| tert-Butyl methacrylate monomer | 10.0 |
| Acetone | 14.5 |
| Toluene | 68.5 |
| 2,2'-Azobis(isobutyronitrile) | 0.5 |
| Thioglycolic acid | 0.3 |

After that, under a nitrogen atmosphere, the temperature of the water bath was set so that the temperature of the reaction liquid became 85° C., and a polymerization reaction was performed for 5 hours. The polymerization reaction was terminated by ice cooling to afford a solution having dissolved therein a compound represented by the chemical formula (III).

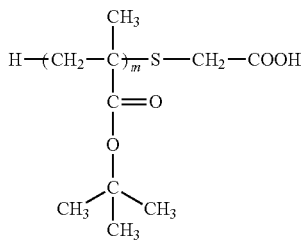
(III)

Then, 60 parts by mass of toluene was additionally loaded, and triethylamine and hydroquinone monomethyl ether were added at 0.5 wt % with respect to the loading amount of the tert-butyl methacrylate monomer and 200 ppm with respect to the loading amount of the tert-butyl methacrylate monomer, respectively. Glycidyl methacrylate was added in a 10-fold molar amount with respect to the acid value of the resultant chemical formula (III), and a reaction was performed at a temperature of 110° C. for 11 hours. The reaction was terminated by water cooling, n-hexane was added, and a precipitate was obtained by centrifugation. After that, the precipitate was dried under reduced pressure under the conditions of a temperature of 80° C. and 1,325 Pa or less for 3 hours to afford a macromonomer No. 2 represented by the formula (IV).

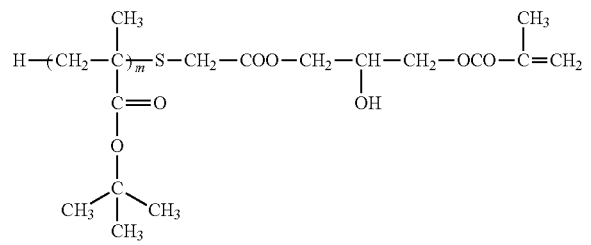
(IV)

<<Macromonomer No. 3>>

A macromonomer No. 3 represented by the chemical formula (V) was obtained by being produced in the same manner as in the macromonomer No. 2 except that glycidyl methacrylate used in the production of the macromonomer No. 2 was changed to glycidyl acrylate.

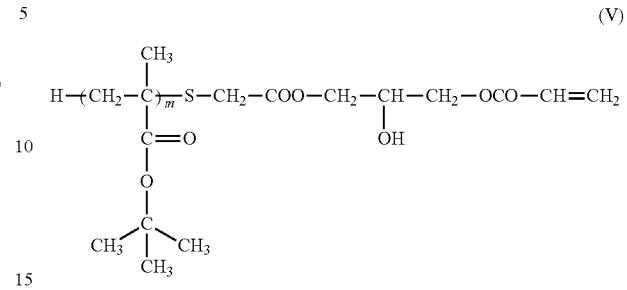
(V)

<<Macromonomer No. 4>>

A macromonomer was produced in the same manner as in the macromonomer No. 2 except for changing:
 the tert-butyl methacrylate monomer to a methyl methacrylate monomer;
 thioglycolic acid to 3-mercaptopropionic acid;
 glycidyl methacrylate to 2-isocyanatoethyl methacrylate;
 triethylamine to zirconium(IV) acetylacetonate;
 the 10-fold molar amount to a 2-fold molar amount; and
 the reaction at a temperature of 110° C. for 11 hours to a reaction at a temperature of 50° C. for 24 hours. A macromonomer No. 4 represented by the chemical formula (VI) was obtained.

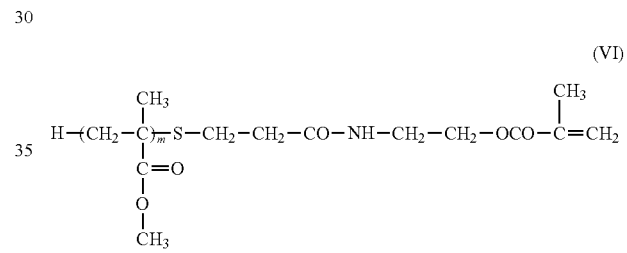
(VI)

<<Macromonomer No. 5>>

A grade having a number-average molecular weight of 2,800 of POLY(METHYL METHACRYLATE) MACROMONOMER, ΩVINYL-TERMINATED from Polymer Source, Inc. was prepared as a macromonomer No. 5.

<<Macromonomer No. 6>>

A grade having a number-average molecular weight of 9,900 of POLY(METHYL METHACRYLATE) MACROMONOMER, ΩVINYL-TERMINATED from Polymer Source, Inc. was prepared as a macromonomer No. 6.

The structures of the macromonomers Nos. 2 to 6 are shown in Table 2. The value of "m" was determined from a peak area ratio of 1H NMR in a CDCl$_3$ solvent.

TABLE 2

| Macromonomer No. | m (average value) | R3 | R4 | R5 |
|---|---|---|---|---|
| 2 | 45 | Methyl | SCH$_2$COOCH$_2$CH(OH)CH$_2$OCO | tert-Butyl |
| 3 | 42 | Hydrogen | SCH$_2$COOCH$_2$CH(OH)CH$_2$OCO | tert-Butyl |
| 4 | 82 | Methyl | SCH$_2$CH$_2$CONHCH$_2$CH$_2$OCO | Methyl |
| 5 | 27 | Methyl ester | CH$_2$ | Methyl |
| 6 | 98 | Methyl ester | CH$_2$ | Methyl |

<Preparation of Monomers Each Having Perfluoro Structure>
<<Perfluoro Structure-Containing Monomer No. 1>>

1H,1H-Perfluoro(2,5-dimethyl-3,6-dioxanonanoyl) acrylate having the structure represented by the following chemical formula (VIII) was used as a perfluoro structure-containing monomer No. 1. The perfluoro structure-containing monomer No. 1 is a material that affords the structure represented by the chemical structural formula (I). In the structure according to the chemical structural formula (I) to be formed by the perfluoro structure-containing monomer No. 1, R1 represents a methylene group ($CH_2$), and R2 represents a hydrogen atom (H).

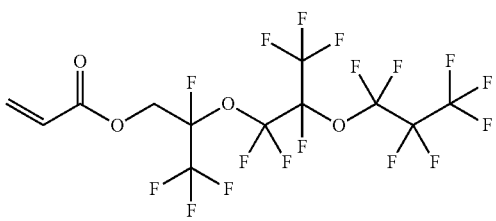 [SMILES: C=CC(=O)OCC(F)(OC(F)(F)C(F)(OC(F)(F)C(F)(F)C(F)(F)F)C(F)(F)F)C(F)(F)F]

<<Perfluoro Structure-Containing Monomer No. 2>>

Materials shown in Table 3 below were loaded into a flask made of glass with a stirrer, a reflux condenser, a nitrogen gas inlet tube, a thermostatic bath, and a temperature gauge, and the materials were mixed at a temperature of 20° C. under a nitrogen atmosphere for 30 minutes. Then, the mixture was heated to a temperature of 50° C. and subjected to a reaction for 24 hours to afford a perfluoro structure-containing monomer No. 2 represented by the chemical formula (VII).

TABLE 3

| Compound name | Blending amount (part(s) by mass) |
| --- | --- |
| 1H,1H-Perfluoro (2,5-dimethyl-3,6-dioxanonan-1-ol) | 48.2 |
| 2-Isocyanatoethyl methacrylate | 15.5 |
| Hydroquinone monomethyl ether | 0.012 |
| Zirconium(IV) acetylacetonate | 0.3 |
| n-Butyl acetate | 100 | to 90° C., followed by a reaction for 5 hours. The reaction was terminated by ice cooling, and 1,500 parts by mass of 2-propanol was added to afford a precipitate. The precipitate was washed with a mixed solvent containing n-butyl acetate and 2-propanol at a ratio of 1:5, and was dried at a temperature of 80° C. under a reduced-pressure state of 1,325 Pa or less for 3 hours to afford a graft copolymer No. 11, which was a copolymer of the macromonomer No. 1 and the perfluoro structure-containing monomer No. 1.

TABLE 4

| Compound name | Blending amount (part(s) by mass) |
| --- | --- |
| Macromonomer No. 1 | 75 |
| Perfluoro structure-containing monomer No. 1 | 50 |
| 1,1'-Azobis(1-acetoxy-1-phenylethane) | 0.437 |
| n-Butyl acetate | 338 |

<<Graft Copolymers Nos. 21, 22, 31, 32, 41, 51, 52, 61, and 62>>

Graft copolymers Nos. 21, 22, 31, 32, 41, 51, 52, 61 and 62 were prepared in the same manner as in the graft copolymer No. 11 except that the kind of the macromonomer, the kind of the perfluoro structure-containing monomer, and the blending amount of 1,1'-azobis(1-acetoxy-1-phenylethane) were set as shown in Table 5.

TABLE 5

| Graft copolymer No. | Macromonomer | | Perfluoro structure-containing monomer | | 1,1'-Azobis(1-acetoxy-1-phenylethane) |
| --- | --- | --- | --- | --- | --- |
| | No. | Part(s) by mass | No. | Part(s) by mass | Part(s) by mass |
| 11 | 1 | 75 | 1 | 50 | 0.437 |
| 21 | 2 | 75 | 1 | 50 | 0.437 |
| 22 | 2 | 75 | 2 | 50 | 0.437 |
| 31 | 3 | 75 | 1 | 50 | 0.437 |
| 32 | 3 | 75 | 2 | 50 | 0.437 |
| 41 | 4 | 75 | 1 | 50 | 0.300 |
| 51 | 5 | 75 | 1 | 50 | 0.437 |
| 52 | 5 | 75 | 2 | 50 | 0.437 |
| 61 | 6 | 75 | 1 | 50 | 0.437 |
| 62 | 6 | 75 | 2 | 50 | 0.437 |

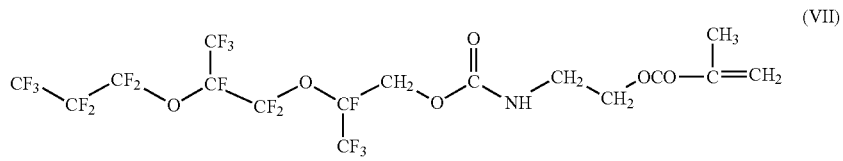

<Preparation of Graft Copolymer>
<<Graft Copolymer No. 11>>

Materials shown in Table 4 below were loaded into a flask made of glass with a stirrer, a reflux condenser, a nitrogen gas inlet tube, a thermostatic bath, and a temperature gauge, and the materials were mixed at 20° C. under a nitrogen atmosphere for 30 minutes. Then, heating was performed so that the temperature of a reaction liquid became from 85° C.

<<Graft Copolymer No. 90>>

A graft copolymer was produced by the same method as in the graft copolymer No. 11 except that the perfluoro structure-containing monomer No. 1 was changed to 2,2,3,3,4,4,4-heptafluorobutyl acrylate having the structure represented by the following chemical formula (IX). Thus, a graft copolymer No. 90 was obtained.

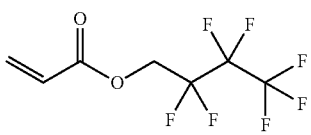

<Measurement of Peak Top Molecular Weight>

The peak top molecular weight of each of the obtained graft copolymers is shown in Table 6. The peak top molecular weight was measured with a gel permeation chromatograph (hereinafter sometimes referred to as "GPC") apparatus GPC-104 (from Shodex) after a measurement sample had been dissolved in tetrahydrofuran (hereinafter sometimes referred to as "THF") to prepare a solution having a concentration of 0.2 mass %. The molecular weight was measured using a column, which had been obtained by connecting one each of "GPC KF-603" and "GPC KF-604" from Shodex, at a column temperature of 40° C. and a flow rate of THF of 1.0 mL/min. The weight-average molecular weight (Mw) of the sample was calculated from a calibration curve that had been prepared in advance using a polystyrene standard substance having a known molecular weight (SM-105 from Shodex).

TABLE 6

| Graft copolymer No. | Peak top molecular weight (in terms of PS standard particles; ×10³) |
|---|---|
| 11 | 24 |
| 21 | 20 |
| 22 | 23 |
| 31 | 20 |
| 32 | 21 |
| 41 | 40 |
| 51 | 20 |
| 52 | 22 |
| 61 | 31 |
| 62 | 30 |
| 90 | 35 |

Example 1

Materials shown in Table 7 below were mixed using a homogenizer to provide a coating material A.

TABLE 7

| Material name | Blending amount (part(s) by mass) |
|---|---|
| Pentaerythritol triacrylate | 95 |
| Methyl ethyl ketone (MEK) | 170 |
| 1-Hydroxycyclohexyl phenyl ketone | 8 |
| FLUOROLINK MD700 (product name; manufactured by Solvay Specialty Polymers) | 40 |
| Graft copolymer No. 11 | 27 |
| Dispersion of zinc oxide particles in methyl ethyl ketone (product name; CX-Z410K, manufactured by Nissan Chemical Corporation) | 25 |

Onto the outer peripheral surface of an endless-shaped electrophotographic belt made of a polyimide resin having carbon black dispersed therein, the electrophotographic belt being mounted onto a full-color multifunctional peripheral (product name: imageRUNNER ADVANCE C5051; manufactured by Canon Inc.) as an intermediate transfer belt, a coating film of the coating material A was applied so as to have a dry thickness of 6 μm. Then, the resultant was dried at a temperature of 70° C. for 3 minutes. After that, the coating film was cured through irradiation with UV light using a high-pressure mercury lamp under the conditions of a peak illuminance at a wavelength of 365 nm of 200 mW/cm², and a cumulative light quantity of 2 J/cm² to form a surface layer. Thus, an electrophotographic belt No. 1 was obtained. The resultant electrophotographic belt was subjected to the following evaluation 1 and evaluation 2.

<Evaluation 1: Measurement of Hardness of Electrophotographic Belt>

The hardness of the electrophotographic belt was measured by a nanoindentation method. Specifically, an indentation hardness was determined by performing a nanoindentation test using a microhardness tester (product name: PICODENTOR HM500; manufactured by Fischer Instruments) and using, as an indenter, a Vickers indenter under the condition of an indentation depth of from 100 nm to 200 nm.

<Evaluation 2: Electrophotographic Characteristic Evaluation>

An electrophotographic image was formed using each of the electrophotographic belts obtained in Examples 1 to 11 and Comparative Example 1, and the resultant electrophotographic image was evaluated.

That is, the electrophotographic belt was mounted as an intermediate transfer belt onto a full-color multifunctional peripheral (product name: imageRUNNER ADVANCE C5760F; manufactured by Canon Inc.), and electrophotographic images were continuously formed on 30,000 sheets under the following conditions. With regard to the formation of the electrophotographic images, the images were formed on 30,000 sheets by repeating the following cycle 300 times: a solid image having a toner laid-on level on the surface of the electrophotographic belt of 0.4 mg/cm² for each of cyan (C), magenta (M), yellow (Y), and black (K), and having an image ratio of 100% was formed on 97 sheets, and then a white solid image having a laid-on level on the surface of the electrophotographic belt of 0 mg/cm² for each of CMYK toners, and having an image ratio of 100% was formed on 3 sheets. The formation of the electrophotographic images was performed under an environment having a temperature of 30° C. and a relative humidity of 80%. In addition, the paper used was "GF-0081" (A3 size, basis weight: 81.4 g/m², thickness: 97 μm, whiteness: about 100%, manufactured by Canon Inc.).

Then, the white solid image having a laid-on level of 0 mg/cm² was visually observed, followed by the recognition of whether or not a streak-like image resulting from a cleaning failure of the surface of the electrophotographic belt was formed on the white solid image, onto which no toner had been intended to be transferred.

Then, when a streak-like image was observed, the cleaning blade brought into abutment with the surface of the electrophotographic belt was visually observed, followed by the recognition of whether or not the toner that had not been secondarily transferred (transfer residual toner) on the surface of the electrophotographic belt had been cleaned off by the cleaning blade. Then, when it was able to be recognized that the transfer residual toner had not been cleaned off by the cleaning blade, it was judged that the streak-like image resulted from a cleaning failure of the surface of the electrophotographic belt. In this evaluation, evaluation was performed by the following criteria based on the result of the above-mentioned observation.

Rank A: A streak-like image resulting from a cleaning failure of the surface of the electrophotographic belt was not found on the white solid image.

Rank B: A streak-like image resulting from a cleaning failure of the surface of the electrophotographic belt was found on the white solid image.

Examples 2 to 10

Coating materials were produced, and electrophotographic belts Nos. 2 to 10 were obtained, in the same manner as in Example 1 except that the graft copolymer No. 11 was changed as shown in Table 8. The resultant electrophotographic belts were each subjected to the above-mentioned evaluation 1 and evaluation 2.

TABLE 8

| | Electrophotographic belt No. | Graft copolymer No. |
|---|---|---|
| Example 1 | 1 | 11 |
| Example 2 | 2 | 21 |
| Example 3 | 3 | 22 |
| Example 4 | 4 | 31 |
| Example 5 | 5 | 32 |
| Example 6 | 6 | 41 |
| Example 7 | 7 | 51 |
| Example 8 | 8 | 52 |
| Example 9 | 9 | 61 |
| Example 10 | 10 | 62 |

Example 11

95 Parts by mass of pentaerythritol triacrylate was changed to 40 parts by mass of bisphenol A-type epoxy acrylate (EBECRYL 600 manufactured by Daicel-Allnex Ltd.) and 55 parts by mass of pentaerythritol triacrylate. In the same manner as in Example 2 except for such change, a coating material was produced, and an electrophotographic belt No. 11 was obtained. The resultant electrophotographic belt was subjected to the above-mentioned evaluation 1 and evaluation 2.

Comparative Example 1

A coating material was produced, and an electrophotographic belt No. 90 was obtained, in the same manner as in Example 1 except that the graft copolymer No. 11 was changed to the graft copolymer No. 90. The resultant electrophotographic belt No. 90 was subjected to the above-mentioned evaluation 1 and evaluation 2. In the evaluation 2, a streak-like image resulting from a cleaning failure occurred in the white solid image formed in the 100th cycle, and hence image formation was stopped at the completion of 200 cycles.

The evaluation results of Examples 1 to 11 and Comparative Example 1 are shown in Table 9.

TABLE 9

| | Electrophotographic belt No. | Evaluation 1 Indentation hardness (MPa) | Evaluation 2 Evaluation rank |
|---|---|---|---|
| Example 1 | 1 | 252 | A |
| Example 2 | 2 | 264 | A |
| Example 3 | 3 | 272 | A |
| Example 4 | 4 | 268 | A |
| Example 5 | 5 | 274 | A |
| Example 6 | 6 | 254 | A |
| Example 7 | 7 | 259 | A |
| Example 8 | 8 | 263 | A |
| Example 9 | 9 | 258 | A |
| Example 10 | 10 | 256 | A |
| Example 11 | 11 | 212 | A |
| Comparative Example 1 | 90 | 114 | B |

The results for the evaluation 1 and evaluation 2 of the electrophotographic belt No. 90 according to Comparative Example 1 are conceivably due to a low ability to disperse the PFPE in the binder resin resulting from a difference between the surface free energy of the comb-shaped graft copolymer No. 90 and the surface free energy of each of the comb-shaped graft copolymers used in Examples. In the electrophotographic belt No. 90, the PFPE in the surface layer was not finely dispersed, and hence, as apparent from the result of the evaluation 1, the hardness of the surface layer was reduced. Conceivably as a result of this, the surface layer was abraded through repeated cleaning of the surface of the electrophotographic belt, and hence the PFPE in the surface layer was lost along with the abrasion. Presumably for this reason, the cleaning property of the surface of the electrophotographic belt was reduced over time.

Meanwhile, in the electrophotographic belt according to each of Examples, the PFPE in the surface layer is finely dispersed, and hence the hardness of the surface layer is maintained at a high level. Accordingly, even when the surface of the electrophotographic belt is repeatedly cleaned, the surface layer is hardly abraded. Besides, by virtue of the PFPE being finely dispersed, even when the surface layer is abraded, domains of the PFPE are present in a substantially uniform manner in the thickness direction of the surface layer. Conceivably for this reason, the cleaning property of the surface of the electrophotographic belt was hardly reduced even by repeated use.

In order to demonstrate the difference in surface free energy between the graft copolymers of Examples and Comparative Example, n-hexadecane contact angles for a thin film of the graft copolymer No. 21 and a thin film of the graft copolymer No. 90 are shown in Table 10.

TABLE 10

| | n-Hexadecane contact angle (°) |
|---|---|
| Graft copolymer No. 21 | 71 |
| Graft copolymer No. 90 | 53 |

Table 11 shows a list of CAS numbers and manufacturer names for materials referred to with generic names among the materials used in Examples.

TABLE 11

| Material name | CAS number | Manufacturer name |
|---|---|---|
| tert-Butyl methacrylate monomer | 585-07-9 | Tokyo Chemical Industry Co., Ltd. |
| 2,2'-Azobis(isobutyronitrile) | 78-67-1 | Tokyo Chemical Industry Co., Ltd. |
| Thioglycolic acid | 68-11-1 | Tokyo Chemical Industry Co., Ltd. |
| Triethylamine | 121-44-8 | Tokyo Chemical Industry Co., Ltd. |
| Hydroquinone monomethyl ether | 150-76-5 | Tokyo Chemical Industry Co., Ltd. |
| Glycidyl methacrylate | 106-91-2 | Tokyo Chemical Industry Co., Ltd. |
| Glycidyl acrylate | 106-90-1 | Tokyo Chemical Industry Co., Ltd. |
| Methyl methacrylate monomer | 80-62-6 | Tokyo Chemical Industry Co., Ltd. |
| 2-Isocyanatoethyl methacrylate | 30674-80-7 | Tokyo Chemical Industry Co., Ltd. |
| Zirconium(IV) acetylacetonate | 17501-44-9 | Tokyo Chemical Industry Co., Ltd. |
| 3-Mercaptopropionic acid | 107-96-0 | Tokyo Chemical Industry Co., Ltd. |
| 1H,1H-Perfluoro(2,5-dimethyl-3,6-dioxanonanoyl) acrylate | 17559-01-2 | Manchester Organics Ltd. |
| 1H,1H-Heptadecafluoro(2,5-dimethyl-3,6-dioxanonan-1-ol) | 14548-74-4 | Apollo Scientific Ltd. |
| 1,1'-Azobis(1-acetoxy-1-phenylethane) | 57908-47-1 | Otsuka Chemical Co., Ltd. |
| Pentaerythritol triacrylate | 3524-68-3 | Sigma-Aldrich |
| 1-Hydroxycyclohexyl phenyl ketone | 947-19-3 | Tokyo Chemical Industry Co., Ltd. |
| 2,2,3,3,4,4,4-Heptafluorobutyl acrylate | 13695-31-3 | Tokyo Chemical Industry Co., Ltd. |

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-072919, filed Apr. 22, 2021, and Japanese Patent Application No. 2022-041929, filed Mar. 16, 2022, which are hereby incorporated by reference herein in their entirety.

What is claimed is:

1. An electrophotographic belt, comprising:
    a base layer; and
    a surface layer comprising perfluoropolyether, a binder resin, and compound 1 having structures represented by formulae (I) and (II):

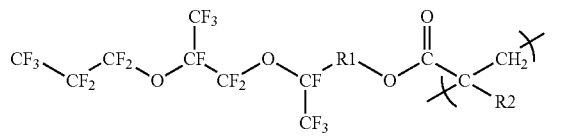

(I)

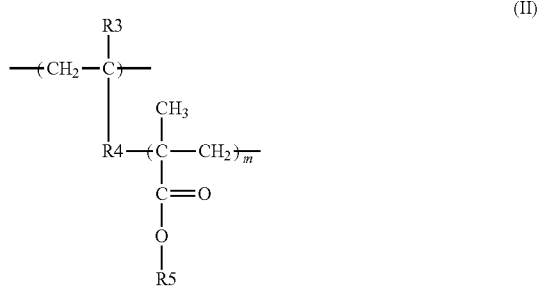

(II)

where R1 represents a linking group,
R2 represents a hydrogen atom or a methyl group,
R3 represents a hydrogen atom, a methyl group or a methyl ester group,
R4 represents a linking group,
R5 represents a methyl group or a tert-butyl group, and
m represents an integer of 25 to 100.

2. The electrophotographic belt according to claim 1, wherein R1 is (i) an alkylene group having 1 to 6 carbon atoms or (ii) a group consisting of a carbon atom, a hydrogen atom, a nitrogen atom and an oxygen atom, having a main chain constituted by 6 or fewer atoms.

3. The electrophotographic belt according to claim 1, wherein R1 is represented by —CH$_2$OC(=O)NHCH$_2$CH$_2$—.

4. The electrophotographic belt according to claim 1, wherein R4 is (i) a group consisting of a carbon atom, a hydrogen atom, an oxygen atom and a sulfur atom, having a main chain constituted by 9 or fewer atoms or (ii) a group consisting of a carbon atom, a hydrogen atom, a nitrogen atom, an oxygen atom and a sulfur atom, having a main chain constituted by 9 or fewer.

5. The electrophotographic belt according to claim 1, wherein R4 is a member selected from the group consisting of —SCH$_2$C(=O)OCH$_2$CH(OH)CH$_2$OC(=O)—, —SCH$_2$CH$_2$C(=O)NHCH$_2$CH$_2$OC(=O)— and —SCH$_2$C(=O)NHCH$_2$CH$_2$OC(=O)—.

6. The electrophotographic belt according to claim 1, wherein the binder resin is at least one member selected from the group consisting of an acrylic resin, a methacrylic resin and an epoxy resin.

7. The electrophotographic belt according to claim 1, wherein compound 1 has a peak top molecular weight of 20,000 to 40,000.

8. An electrophotographic image forming apparatus, comprising:
    an image bearing member configured to bear a toner image; and
    an intermediate transfer belt configured to carry and convey the toner image that is primarily transferred from the image bearing member in order to secondarily transfer the toner image onto a transfer material,
    the intermediate transfer belt being an electrophotographic belt comprising a base layer and a surface layer, wherein
    the surface layer comprises perfluoropolyether, a binder resin, and compound 1 having structures represented by formulae (I) and (II):

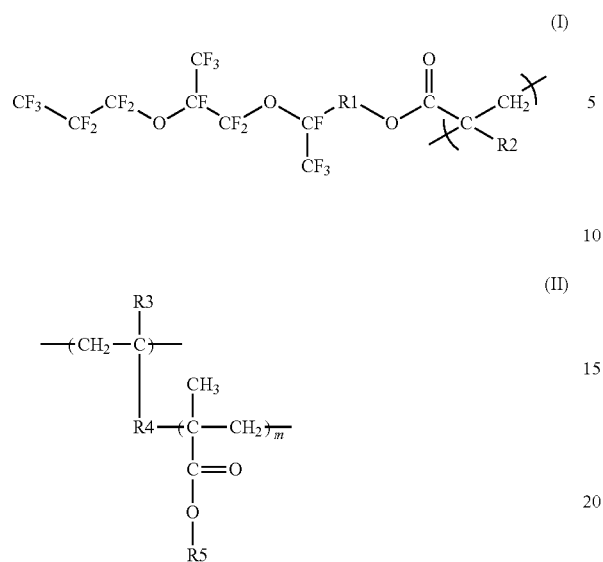
where R1 represents a linking group,
R2 represents a hydrogen atom or a methyl group,
R3 represents a hydrogen atom, a methyl group or a methyl ester group,
R4 represents a linking group,
R5 represents a methyl group or a tert-butyl group, and
m represents an integer of 25 to 100.